United States Patent [19]

Mizobuchi et al.

[11] Patent Number: 4,806,080

[45] Date of Patent: Feb. 21, 1989

[54] PUMP WITH SHAFTLESS IMPELLER

[75] Inventors: Shotaro Mizobuchi, Kanagawa; Katsumi Sasaki, Tokyo; Yoshikazu Kimura, Kanagawa, all of Japan

[73] Assignee: Ebara Corporation, Tokyo, Japan

[21] Appl. No.: 14,530

[22] Filed: Feb. 13, 1987

Related U.S. Application Data

[63] Continuation-in-part of Ser. No. 627,731, Jul. 3, 1984.

[30] Foreign Application Priority Data

Jul. 6, 1983 [JP] Japan .................................. 58-121567

[51] Int. Cl.$^4$ ............................................. F04D 29/04
[52] U.S. Cl. ...................................... 417/353; 417/365; 417/423.15; 417/423.12; 384/123; 384/907.1; 384/913; 415/174
[58] Field of Search ............ 417/423 L, 423 P, 423 T, 417/353, 365, 423 G; 384/123, 907.1, 913; 415/170 B, 173 A, 174

[56] References Cited

U.S. PATENT DOCUMENTS

| | | | |
|---|---|---|---|
| 2,635,547 | 4/1953 | Cataldo | 417/423 P |
| 2,700,343 | 1/1955 | Pezzillo | 417/365 X |
| 3,364,866 | 1/1968 | Sato | 417/365 |
| 3,497,273 | 2/1970 | Muijderman et al. | 384/113 |
| 3,591,243 | 7/1971 | Kippenberg et al. | 384/907.1 X |
| 3,663,074 | 5/1972 | Fernlund | 384/123 |
| 3,711,171 | 1/1973 | Orkin et al. | 384/907.1 X |
| 3,781,136 | 12/1973 | Jacobson | 417/353 |
| 3,853,429 | 12/1974 | Wiedenmann | 417/423 G |
| 4,242,039 | 12/1980 | Villard et al. | 419/170 B |
| 4,315,359 | 2/1982 | Gray | 384/100 X |
| 4,380,355 | 4/1983 | Beardmore | 384/123 |
| 4,410,285 | 10/1983 | Strasset et al. | 308/DIG. 8 X |
| 4,575,264 | 3/1986 | Mizobuchi et al. | 384/123 X |
| 4,655,681 | 4/1987 | Mori et al. | 415/170 B |
| 4,664,592 | 5/1987 | Grzina | 415/170 B |
| 4,699,525 | 10/1987 | Mizobuchi et al. | 384/123 X |

FOREIGN PATENT DOCUMENTS

15121  1/1982  Japan .................................. 384/100

OTHER PUBLICATIONS

"Spiral Groove Bearing-Compact and High Bearing Load", Seiho Yamamoto, Nikkei Mechanical 1979, 5.28.

"Grease-Lubricated Spiral-Groove Bearings", E. A. Muijderman et al., Philips Tech, Rev. 39, 184–198, 1980, No. 6/7.

"Design and Performance of Complaint Thrust Bearings with Spiral-Groove Members on Resilient Supports", L. Licht et al., Journal of Lubrication Technology, Jul. 1981, vol. 103/373.

"Dynamic Groove Bearing (Mass-Production, High Loading Capacity Precision in Rotating Accuracy)", Nikkei Mechanical 1982, 5.24.

Primary Examiner—Carlton R. Croyle
Assistant Examiner—Theodore Olds

[57] ABSTRACT

A pump including an impeller having a magnet or a second conductor therein, the impeller being adapted to be directly rotated by virtue of magnetic fields of stator coils. The impeller is rotated within a casing in close proximity thereto via ceramic bearing members, one bearing member having spiral grooves on its slide surface. The ceramic bearing members constitute a dynamic pressure bearing means.

23 Claims, 8 Drawing Sheets

PUMP WITH SHAFTLESS IMPELLER

This application is a continuation-in-part of application Ser. No. 627,731, filed July 3, 1984.

BACKGROUND OF THE INVENTION

The present invention relates to a pump including an impeller having a magnet or a second conductor therein, which is adapted to be directly rotated by virtue of magnetic fields of stator coils, and more particularly to a pump including an impeller which is rotated within a casing in close proximity thereto via ceramic bearing members, one bearing member having spiral grooves on its slide surface.

In a conventional pump, an impeller having a magnet or a secondary conductor therein is directly driven by stator coils, as disclosed in the Japanese Patent Laid-Open Specification No. 49-129106.

Figure 1:
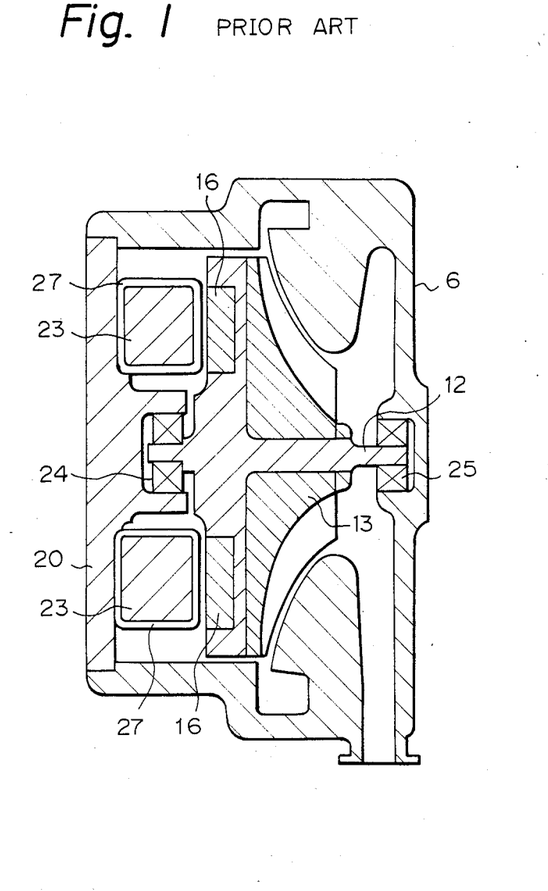
FIG. 1 is a longitudinal cross sectional view of a conventional pump.

FIG. 1 is a longitudinal cross sectional view of such a conventional pump. In the drawing, an impeller 13 arranged within a pump casing 6 is provided with an annular permanent magnet 16 in its outer rear end perpendicular to a rotary axle 12 of the impeller 13, and the surface of the annular permanent magnet 16 is coated with a synthetic resin (not shown) for preventing it from contacting with liquid in the casing 6. The rear end of the casing 6 is closed by a rear plate 20 on which stator coils 23 and a rear bearing 24 for supporting the impeller 13 are mounted. A- front bearing 25 for supporting the impeller 13 is mounted to the casing 6. The stator coils 23 are covered by a plastic film 27 for preventing them from contacting with the liquid.

When the impeller 13 stands still, the impeller 13 is biased towards the rear plate 20 by the drawing force of the permanent magnet 16, and, when the impeller 13 is rotated, in general, the impeller 13 is urged frontwards of the pump casing 6 by its discharging pressure. Hence, the bearings 24 and 25 are constructed so as to support the radial load as well as the thrust load. The impeller 13 shown in FIG. 1 is a so-called open type having a suitable structure for dealing with liquid containing solid particles such as crystals.

In the conventional pump of FIG. 1, a secondary conductor may be provided in the impeller 13 instead of the permanent magnet 16. In this case, the stator coils 23 are so wound as to impart rotary magnetic fields when an alternating current is applied to the stator coils 23.

Figure 2:
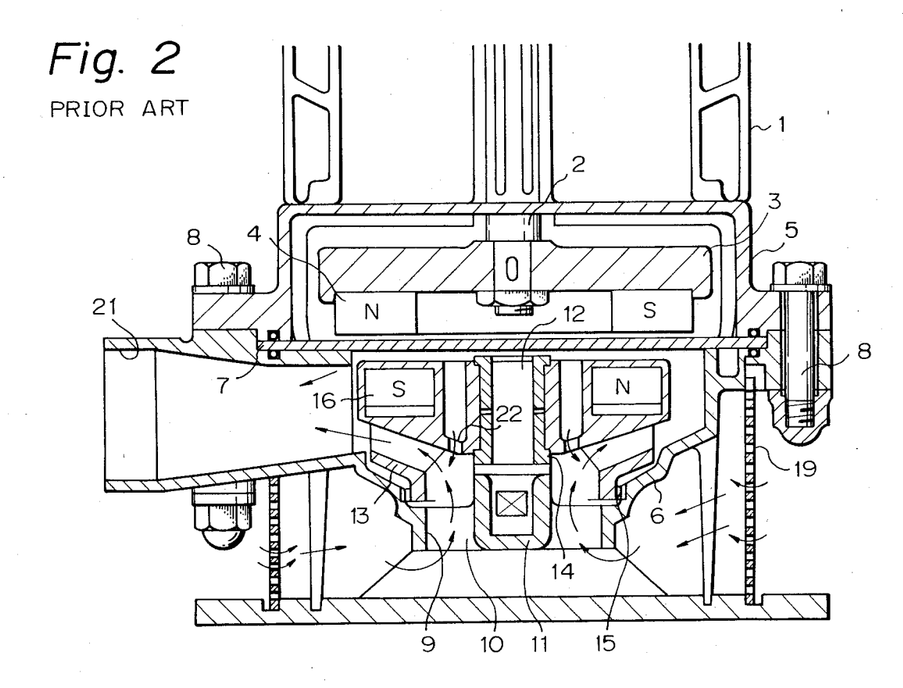
FIG. 2 is a longitudinal cross sectional view of another conventional pump.

In FIG. 2, there is shown another conventional pump. In this embodiment, a motor 1 has a rotary shaft 2 therein, and an iron yoke 3 is secured to the free end of the rotary shaft 2. An annular permanent magnet 4 is attached to the iron yoke 3, and the N and S polarities are alternately magnetized at equal intervals in the peripheral direction of the annular permanent magnet 4. A lower bracket 5 of the motor 1 is mounted to a pump casing 6 through a non-magnetic partition plate 7 by bolts and nuts 8. A plurality of arm members 10 are radially arranged in a suction opening 9 of the pump casing 6, and suction paths are defined by the arm members 10. A boss 11 is disposed to the center of the arm members 10, and a rotary pump shaft 12 which is coaxial with the rotary shaft 2 of the motor 1, is mounted to the boss 11. A bearing member 14 having flanges, press-fitted in a central hole of an impeller 13, is fitted on the rotary pump shaft 12. A liner ring 15 is press-fitted in the suction opening portion of the pump casing 6 in order to seal the gap between the outer periphery of the suction inlet of the impeller 13 and the inner surface of the pump casing 6.

In the upper end of the impeller 13, permanent magnets 16 of different N and S polarities are alternately and radially arranged, opposing the annular permanent magnet 4 of the motor 1 through the partition plate 7.

When the motor 1 is driven, the rotary shaft 2 is rotated together with the yoke 3 and the annular permanent magnet 4, and then the permanent magnets 16 of the impeller 13 are driven by the magnetic force of the annular permanent magnet 4, thereby rotating the impeller 13 around the pump shaft 12. Accordingly, the liquid is sucked from the suction opening 9 of the pump casing 6 and then is sucked up by the impeller 13, and the pressurized liquid is discharged from an outlet 21 of the pump casing 6. A part of the pressurized liquid flows between the upper part of the impeller 13 and the partition plate 7 towards the central portion to pass through balancing holes 22 and is then returned to the low pressure side of the impeller 13, for balancing the pump thrust.

In the above described pump, the rotary shaft 2 of the motor 1 is separated from the rotary pump shaft 12, and hence no special sealing means for the shaft is necessary, and the liquid in the pump side is separated from the motor side by the partition plate 7. Accordingly, a strong acidic liquid, a strong alkaline liquid, a strong toxic liquid or a liquid to be prevented from leaking outside the pump may be transferred by the pump of this kind, and further, in turn, by using this pump, a liquid to be dealt with may be prevented from having a contaminant from the outside mixed therewith in a producing process of foods, medicines, soft drinks, semi-conductors and so forth.

However, in fact, in the conventional pumps shown in FIGS. 1 and 2, the impeller is supported by the bearings in contact therewith, and thus, when the impeller is rotated, powder is produced from the wear of the bearing portions. In the conventional pump of FIG. 2, the magnetic gap between the annular permanent magnet 4 of the driving side and the permanent magnets 16 of the impeller 13 is increased, and accordingly a pump having a large output cannot be obtained. Further, in these conventional pumps, when stopping the pumps for a long time, the material of the bearings is subjected to a plastic deformation by the drawing force of the permanent magnets, and, when the pump is driven again, it is impossible to operate the pump or a large starting torque is necessary to start the pump. Further, in the conventional pumps, since the rotary shaft of the impeller is supported by the bearing means or the impeller is rotatably supported at its axle by the bearing means, that is, the conventional impeller requires a rotary shaft having a certain length along the axis of the impeller, the length of the impeller and hence of the pump in the axial direction is restricted and can not be reduced.

SUMMARY OF THE INVENTION

Accordingly, it is an object of the present invention to provide a pump having a magnetic gap in its axial direction, free from the aforementioned defects and disadvantages of the prior art, which is capable of having a reduced starting torque, of supporting the thrust of the pump with a small power loss during the operation, of preventing production of powder from wearing of the bearing portions, of effectively removing the heat generated in the stator coils, of minimizing the retention of the liquid in the pump casing and of producing a large output, and which is simple and compact in construction.

In accordance with one aspect of the invention, there is provided a pump comprising a casing having an inlet and an outlet, an impeller having a rotary axis, arranged within the casing, driving force receiving means disposed on the impeller, stator coils arranged within the casing, which impart the driving force to the driving force receiving means, separating means mounted to the casing for separating the impeller from the stator coils, a first element secured to one end of the impeller in a plane perpendicular to the rotary axis of the impeller, and a second stationary element arranged in the casing opposing to the first element in parallel therewith, the first and the second elements being adapted to abut against each other at their flat surfaces, one of the opposed flat surfaces of the first and the second elements having a spiral groove pattern, the first and the second elements being made of a ceramic material.

In a preferred embodiment of the invention, the ceramic material is a sintered body selected from the group consisting of $\alpha$-SiC, $\beta$-SiC, $Al_2O_3$ and $Si_3N_4$, and the spiral groove pattern is formed by a shot-blasting process.

In another preferred embodiment of the invention, the first element is secured to the central portion of the rear end of the impeller, the rear end of the impeller facing the separating means, and the first element is provided with the spiral groove pattern on its flat surface. Alternatively, the first element is secured to the central portion of the front end of the impeller, the rear end of the impeller facing the separating means, and the second element is provided with the spiral groove pattern on its flat surface.

In still another preferred embodiment of the invention, the first element is an annular plate, and the second element is an annular plate of the same form as that of the first element, the second element being mounted to the inlet portion of the casing. The pump further comprises a third element secured to the central portion of the rear end of the inpeller in a plane perpendicular to the rotary axis of the impeller, and a fourth stationary element arranged in the casing opposing to the third element in parallel therewith, the third and the fourth elements being made of a ceramic material.

The impeller is provided with a central through-hole along its rotary axis, and the first element is an annular plate which is secured to the impeller coaxially with the central through-hole. The first element is a circular plate which is secured to the impeller coaxially with its rotary axis.

The driving force receiving means is an annular permanent magnet which is arranged in the outer rear end of the impeller and surrounds the first element.

Other and further objects, features and advantages of the invention will appear more fully from the following description with reference to the preferred embodiments thereof taken in conjunction with the accompanying drawings, in which:

DESCRIPTION OF THE PREFERRED EMBODIMENTS

Figure 3:
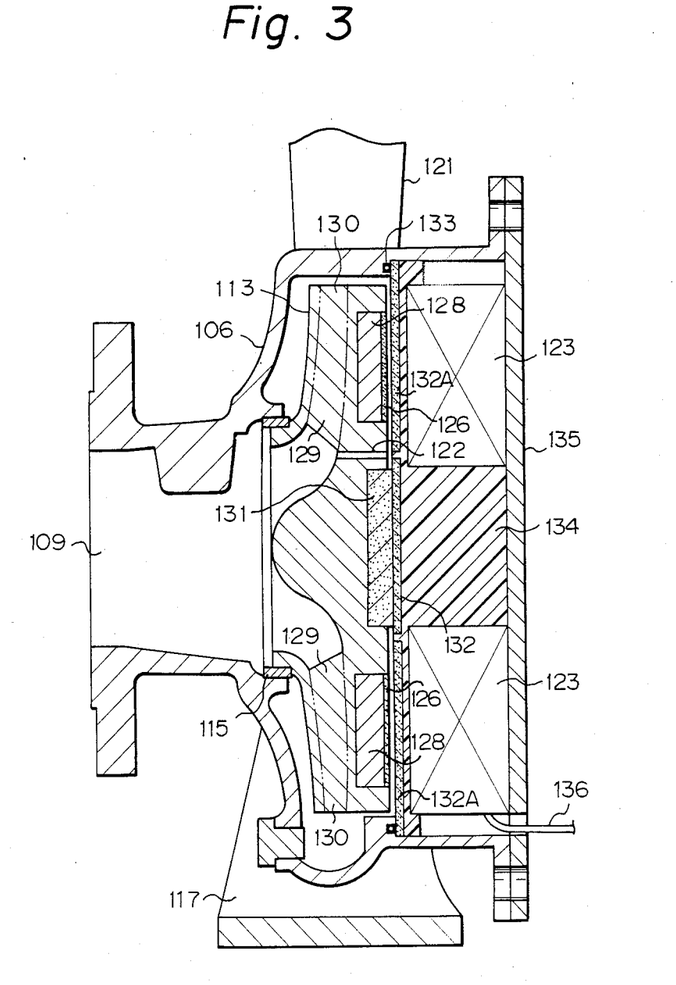
FIG. 3 is a longitudinal cross sectional view of one embodiment of a pump according to the present invention.

Referring now to the drawings, wherein like reference numerals designate similar or corresponding components throughout the different figures, there is shown in FIG. 3 one embodiment of a pump according to the present invention.

In the drawing, an impeller 113 is arranged in a pump casing 106, and an annular permanent magnet 128 is embedded in an outer rear end portion of the impeller 113 perpendicular skew to a rotary axis thereof. An annular ceramic protecting thin plate 126 is adhered to the outer surface of the magnet 128 for protecting the magnet 128. In the annular permanent magnet 128, different magnetic polarities are alternately spaced at equal distances in its peripheral direction. Reference numerals 129 and 130 denote blades of the impeller 113 and flow paths, respectively.

The impeller 113 is provided with a ceramic flat disk plate 131 in its central rear end constituting a bearing portion, and the disk plate 131 made of a silicon carbide sintered body by an atmospheric sintering process, defines a rotary slide surface. The rotary slide surface of the ceramic disk plate 131 is finished smooth, for instance, Rmax$\leq$3 $\mu$m or so by a lapping process, and then spiral grooves 138 having a depth of about 3–50 $\mu$m are formed therein by a shot-blasting process.

Reference numerals 109, 115, 117, 121 and 122 designate an inlet, a liner ring press-fitted in the casing 106, a leg portion, an outlet and a balancing hole formed in the impeller 113.

The rear opening of the pump casing 106 is closed by a rear casing 135 by securing flange thereof by means of bolts and nuts (not shown), and stator coils 123 are radially mounted to the inner wall of the rear casing 135 corresponding to the polarities of the annular permanent magnet 128. The front sides of the stator coils 123 are covered and sealed by a synthetic resin 134 for preventing the liquid in the pump casing 106 from contacting them. A circular ceramic bearing plate 132 made of the same material as the ceramic disk plate 131 is adhered to the synthetic resin 134 opposing which is disk plate 131 which is adapted to abut thereon and is positioned in the center with reference to the stator coils 123. The surface of the ceramic bearing plate 132 is finished to be smooth in the same manner as the ceramic disk plate 131 and defines a slide surface corresponding to the slide surface of the ceramic disk plate 131. An annular ceramic plate 132A is adhered to the synthetic resin 134 opposite to the annular permanent magnet 128 with a gap therebetween for preventing the surface of the synthetic resin 134 covering the stator coils 123 from wearing due to solid particles in the liquid or the shearing stress of the liquid. The annular ceramic plate 132A may be made of the same material as the ceramic disk plate 131, and, in consideration that the annular ceramic plate 132A is backed by the synthetic resin 134 and the stator coils 123 and the annular ceramic plate 132A is attached to the synthetic resin 134 as a wearproof member therefor, the annular ceramic plate 132A may be made thin compared with the ceramic bearing plate 132, resulting in that the magnetic gap may be reduced.

In the inner surface of the pump casing 106, a groove is formed and an O-ring 133 is fitted in the groove for sealing the contact surfaces between the ceramic plate 132A and the pump casing 106 from the liquid in the pump casing 106. The stator coils 123 are connected to an electric power source (not shown) through electric wires 136. A hole element (not shown) is attached to the rear surface of the ceramic plate 132A for detecting the polarities of the annular permanent magnet 128. The detected polarities are sent to a control means (not shown) and the impeller 113 may be rotated under the best conditions by controlling the stator coils 123 by means of the control means.

Figure 4:
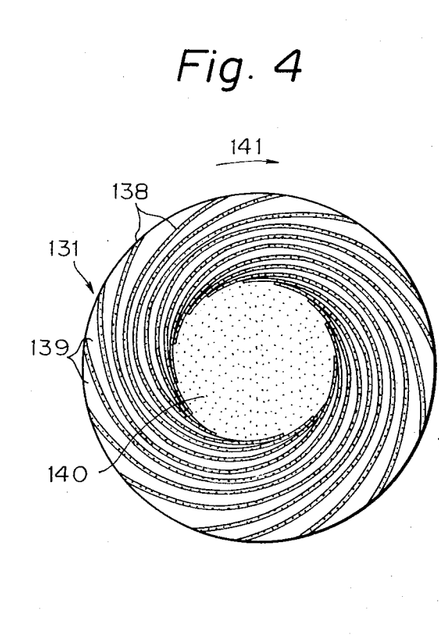
FIG. 4 is an end view of a disk plate defining a rotary slide surface of the pump of FIG. 3.

In FIG. 4, there is shown the rotary slide surface of the ceramic disk plate 131 shown in FIG. 3. A plurality of spiral grooves 138 are formed in the rotary slide surface of the ceramic disk plate 131 and the spiral grooves 138 are excavated to a depth of about 3-50 $\mu$m between ridges or lands 139 between the spiral grooves 138. The ceramic disk plate 131 is provided with a central recessed portion 140 leading to all spiral grooves 138.

The ceramic disk plate 131 is produced as follows. First, the slide surface of the ceramic disk plate 131 is finished to be smooth such as $R_{max} \leq 3$ $\mu$m or so by a lapping process, as described above, and then the smoothed surface is covered by a plastic or metallic mask corresponding to the shape of the lands 139. Then, the masked slide surface of the ceramic disk plate 131 is treated by a shot-blasting process to form the spiral grooves 138. The shape of the spiral grooves 138 may be a conventional spiral pattern.

The arrow 141 of FIG. 4 indicates the turning direction of the impeller 113. When the impeller 113 is rotated, the liquid is sucked the space between the rotary slide surface of the ceramic disk plate 131 and the slide surface of the ceramic bearing plate 132, and the rotating impeller becomes close to the pump casing 106. Hence, the impeller 113 is substantially supported by the liquid film between the ceramic disk plate 131 and the ceramic bearing plate 132 during the rotation of the impeller 113. Accordingly, the ceramic disk plate 131 of the impeller 113 is not directly contacted with the ceramic bearing plate 132 of the stationary side while the impeller 113 is rotated.

Figure 5:
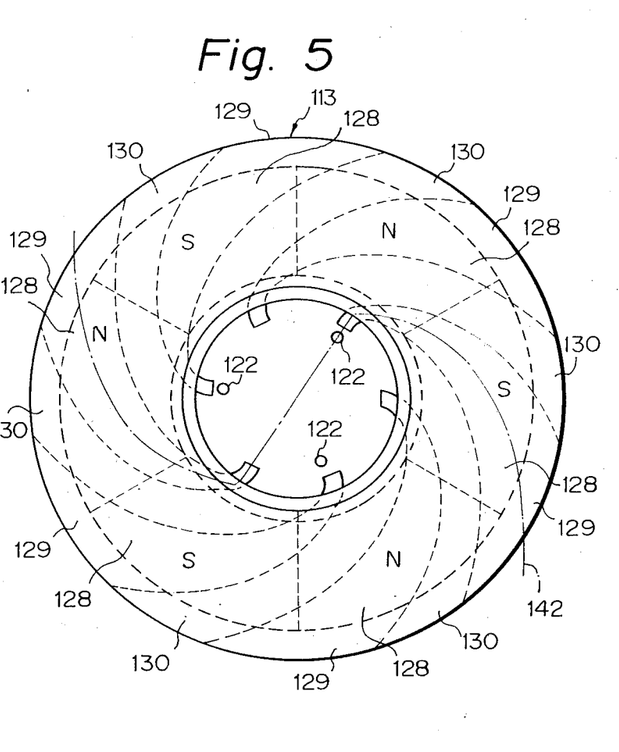
FIG. 5 is an end view of an impeller of the pump of FIG. 3.

In FIG. 5, there is shown the impeller 113 seen from its suction opening side. This impeller 113 is a so-called closed type and is provided radially with liquid paths 130 in its inside. In this case, six polarities are magnetized in the annular permanent magnet 128 at equal distances and a plurality of polarities may be generally imparted in the annular permanent magnet 128. A plurality of wings 129 defining the liquid paths 130 are widened in the outer direction, but this structure is not essential. The numeral 142 of FIG. 5 indicates a one-dotted sectional line of the impeller 113 shown in FIG. 3.

Figure 6:
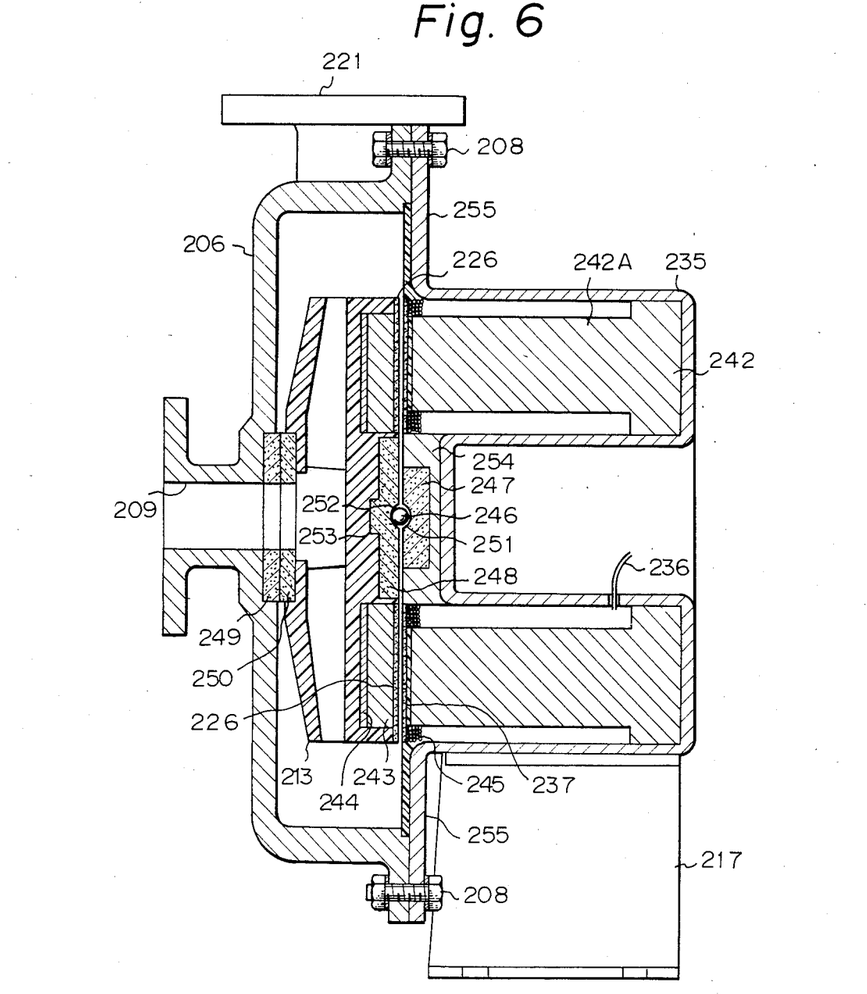
FIG. 6 is a longitudinal cross sectional view of another embodiment of the pump according to the present invention.

In FIG. 6, there is shown another embodiment of the pump according to the present invention. This embodiment of the pump includes a pivot bearing means and a dynamic pressure bearing means as described in detail hereinafter. In this case, a pump casing 206 and a rear casing 235 are coupled to each other by bolts and nuts 208, and a impeller 213 is arranged in the pump casing 206.

The rear casing 235 made of a stainless steel plate is provided with a rear peripheral annular projection space, and a plurality of magnetic cores 242, each having a reduced projection 242A in its front, are radially arranged in the rear peripheral annular projection space of the rear casing 235 at equal intervals. A plurality of stator coils 245 are wound around the projections 242A along their entire lengths, parts of which are shown in FIG. 6, and the front ends of the cores 242 and the stator coils 245 are protected by an annular ceramic protecting plate 237. In the center of the rear casing 235, a hard ceramic bearing plate 247 having a hemispherical recess 251 in its central surface is secured via a synthetic resin 254. The synthetic resin 254 is also applied to the stator coils 245, between the annular ceramic protecting plate 237 and the stator coils 245 and to an inner surface of a flange portion 255 of the rear casing 235.

In practice, the ceramic bearing plate 247 and the ceramic protecting plate 237 together with the cores 242 and the stator coils 245 are secured to the rear casing 235 as follows. That is, firstly, the cores 242 on which the stator coils 245 are wound in advance, are mounted to the rear casing 235 by screws or the like. Then, the ceramic bearing plate 247 having the hemispherical recess 251, the ceramic protecting plate 237 and the rear casing 235 along with the cores 242 and the stator coils 245 are set in a metallic mold of an injection molding apparatus, and then the molten synthetic resin 254 is injected into the metallic mold and then is cured therein. In this case, the synthetic resin flows into not only the space between the ceramic bearing plate 247 and the rear casing 235 but also between the ceramic protecting plate 237 and the stator coils 245, into the stator coils themselves and to the inner surface of the flange portion 255 of the rear casing 235. Accordingly, the liquid in the pump casing 206 only contacts the ceramic members and the synthetic resin of the rear casing 235.

An annular hard ceramic bearing plate 249 is adhered to the inner wall of the pump casing 206 at the rear end of a suction opening 209 thereof in a plane perpendicular to the axis of the pump casing 206 by using an adhesive, and an annular hard ceramic end plate 250 is secured to the front end of the impeller 213 opposite to the surface of the annular hard ceramic bearing plate 249. The opposite surfaces of the annular hard ceramic bearing plate 49 and the annular hard ceramic end plate 250 are finished to be smooth in the same manner as the embodiment of FIG. 3, and the annular hard ceramic bearing plate 249 is provided with spiral grooves in the same manner as the embodiment of FIG. 3. The annular hard ceramic bearing plate 249 and the annular hard ceramic end plate 250 constitute a bearing means.

The impeller 213 is provided with an annular permanent magnet 243 in its outer rear end portion. An annular iron thin plate 244 is arranged between the annular permanent magnet 243 and the impeller 213 for promoting the magnetic efficiency, and an annular ceramic protecting plate 226 is adhered to the surface of the annular permanent magnet 243 for protecting the same. The impeller 213 is made of a synthetic resin material such as fluororesin and polypropylene resin. The impeller 213 is formed with a hard ceramic rear end plate 248 on its central rear end, and the ceramic rear end plate 248 has a semispherical recess 252 on its central surface and a projection 253 on its central front end opposite to the semispherical recess 52 for supplementing the strength of the ceramic end plate 248 which would otherwise be reduced due to the formation of the semispherical recess 252. In this case, the rear end surface of the ceramic end plate 248 projects rearwards in the axial direction more than that of the ceramic protecting plate 226 and hence the gap between the ceramic bearing plate 47 and the ceramic end plate 248 is smaller than that between the ceramic protecting plates 226 and 237.

The semispherical recesses 251 and 252 of the ceramic bearing plate 247 and the ceramic end plate 248 are so positioned along the rotary axis of the impeller 213 as to constitute substantially a spherical space, and a hard ceramic small ball 246 is arranged within the spherical space composed of the semispherical grooves 251 and 252 and the diameter of the ceramic small ball 246 is slightly larger than that of the spherical space composed of the semispherical recesses 251 and 252, with the result that the ceramic bearing plate 247, the ceramic end plate 248 and the ceramic small ball 246 constitute a pivot bearing means. The opposite surfaces of the ceramic bearing plate 247 and the ceramic end plate 248 are finished to be smooth in the same manner as the ceramic bearing plate of the embodiment of FIG. 3.

In FIG. 6, the length between the front surface of the ceramic front end plate 250 and the rear surface of the ceramic rear end plate 248 of the impeller 213 is lens than that between the surface of the ceramic front bearing plate 249 and the surface of the ceramic rear bearing plate 247. The stator coils 245 are connected to an electric power source (not shown) through electric wires 236. Since the ceramic protecting plate 237 is reinforced by the synthetic resin 254, the thickness of the ceramic protecting plate 237 may be reduced. When coupling the pump casing 206 and the rear casing 235 by means of the bolts and nuts, the contact surfaces between these two members are properly sealed by the synthetic resin 245 applied onto the inner surface of the flange portion 255 of the rear casing 235. Alternatively, an O-ring or an adhesive may be used between the contact surfaces of the pump casing 206 and the rear casing 235 for sealing therebetween.

Figure 7:
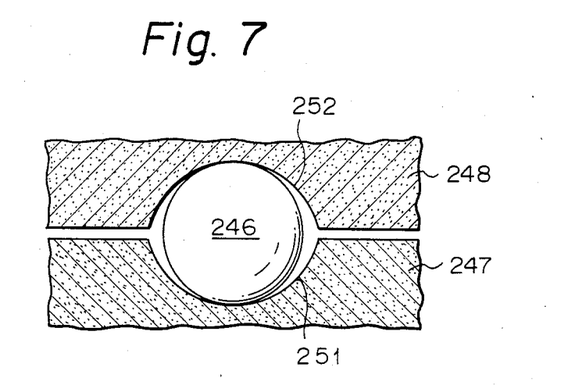
FIG. 7 is a longitudinal cross sectional view of a bearing portion of the pump of FIG. 6.

FIG. 7 is a longitudinal cross sectional view of the semispherical recesses 251 and 252 of the ceramic bearing plate 247 and the ceramic end plate 248 and the ceramic small ball 246 arranged in the spherical space composed of the semispherical recesses 251 and 252. As shown in FIG. 7, the ceramic small ball 246 has a true sphere form, but the spherical space composed of the semispherical recesses 251 and 252 has a slightly elliptic longitudinal cross section. In practice, as shown in FIG. 7, when the ceramic small ball 246 is contacted with the bottoms of the semispherical recesses 251 and 252 of the ceramic bearing plate 247 and the ceramic end plate 248, the average gap between the ceramic bearing plate 249 and the ceramic end plate 250 at the suction opening 209 of the pump casing 206 is 0.1–0.3 mm.

Next, when the stator coils 245 are switched on, the impeller 213 is drawn towards the stator coils 245 by virtue of the magnetic force at a low speed, and the impeller 213 is supported at its rear end by the pivot bearing means composed of the ceramic small ball 246, the ceramic bearing plate 247 and the ceramic end plate 248. Then, as the rotation speed of the impeller 213 increases, the pumping pressure is produced and thus the impeller 213 is moved towards the suction opening 209 by the back pressure. Then, the gap between the ceramic bearing plate 249 and the ceramic end plate 250 is reduced, and the impeller 213 is rotated in close proximity to the pump casing 206 at a dynamic pressure bearing means composed of the ceramic bearing plate 249 and the ceramic end plate 250. Hence, a dynamic pressure is generated at this dynamic pressure bearing means, and therefore, even when a large thrust load is given to the dynamic pressure bearing means, a liquid film is formed between the ceramic bearing plate 249 and the ceramic end plate 250. Accordingly, the ceramic end plate 250 of the impeller 213 is not directly contacted with the ceramic bearing plate 249 of the pump casing 206 during the regular rotation of the impeller 213. Hence, it is readily understood that the thrust load of the impeller 213 is supported depending on its rotation speed such as by the pivot bearing means in the low speed range and by the dynamic pressure bearing means at the regular speed. The radial load of the impeller 213 is supported by the magnetic force and the ceramic small ball 246.

When the discharging pressure of the pump is small, since the impeller 213 is always drawn towards the stator coils 245 by the magnetic force, the pivot bearing means between the rear end of the impeller 213 and the stator coils 245 should be changed to a dynamic pressure bearing means, as shown in the embodiment of FIG. 3. In this modified embodiment, the diameter of the ceramic small ball 246 is reduced to be slightly smaller than that of the spherical space composed of the semispherical recesses 251 and 252, and one of the ceramic bearing plate 247 and the ceramic end plate 248 is formed with spiral grooves around its semispherical recess 251 or 252 in the same manner as described above. In this case, the ceramic small ball 246 only supports the radial load of the impeller 213 and the thrust load of the impeller 213 is supported by the dynamic pressure bearing means composed of the ceramic bearing plate 247 and the ceramic end plate 248.

Figure 8:
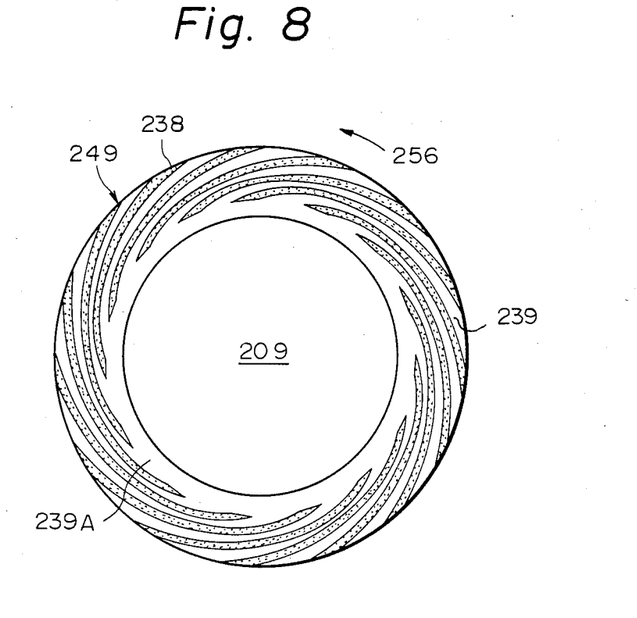
FIG. 8 is an end view of a bearing plate of the pump of FIG. 6.

In FIG. 8, there is shown the grooved surface of the ceramic bearing plate 249 mounted at the suction opening 209 of the pump casing 206, and an arrow 256 indicates the regular turning direction of the impeller 213. When the impeller 213 is rotated at the regular speed, the thrust load is imposed on the front side of the pump casing 206, and the ceramic end plate 250 comes in close proximity to the ceramic bearing plate 249. Then, the liquid in the pump casing 206 flows in the spiral grooves 238 from their peripheries to the center, and, since the flow paths are narrowed by the innermost lands 239A, the dynamic pressure is generated on this slide surface.

Figure 9:
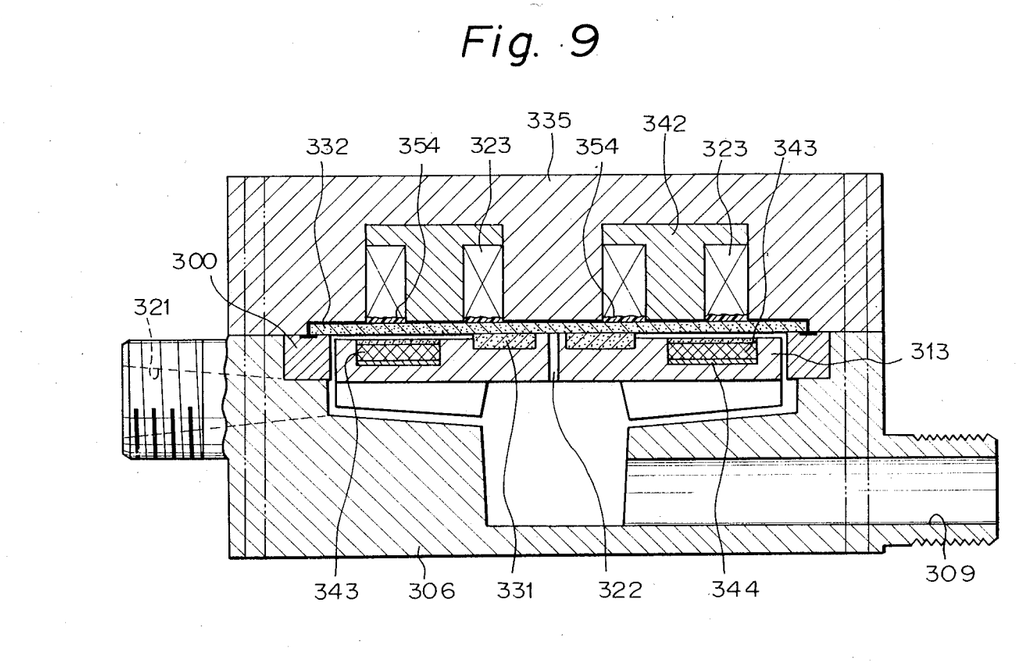
FIG. 9 is a longitudinal cross sectional view of a still another embodiment of the pump according to the present invention.

In FIG. 9, there is shown still another embodiment of the pump according to the present invention. The upright pump comprises a pump casing 306 having a suction inlet 309 and an outlet 321, an impeller 313 made of a synthetic resin material, arranged within the pump casing 206, and an upper casing 335 mounted on the pump casing 306.

A plurality of magnetic cores 342 are mounted to the upper casing 335, and a plurality of stator coils 323 are wound around the respective cores 342. A ceramic large disk plate 332 covers the lower ends of the stator coils 323 and the cores 342 and is adhered to the lower end of the upper casing 335 as well as the stator coils 323 and the cores 342 by using a synthetic resin 354.

Figure 10:
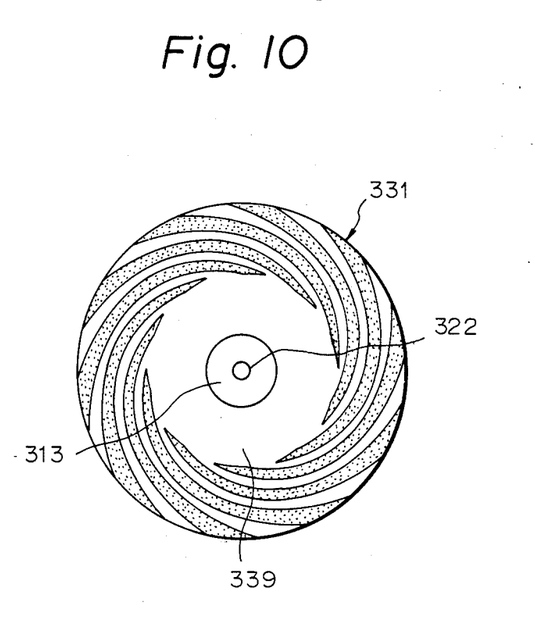
FIG. 10 is a top view of a disk plate mounted to an impeller of the pump of FIG. 9.

The impeller 313 is provided with an annular permanent magnet 343 in its outer upper end portion, and an annular iron thin plate 344 is arranged under the annular permanent magnet 343. The impeller 313 is provided with a balancing hole 322 along its rotary axis, and an annular ceramic disk plate 331 is coaxially secured to the central upper end of the impeller 313 around the balancing hole 322. The annular ceramic disk plate 331 is provided with spiral grooves in the same manner as in the embodiments described above, as shown in FIG. 10. The annular ceramic disk plate 331 possesses a circular land 339 on its upper center so that a dynamic pressure may be generated upon the spiral groove area.

In this embodiment, by providing the balancing hole 322 along the axis of the impeller 313, the back pressure on the impeller 313 is balanced with the pressure of the inlet 309. Accordingly, the back pressure on the central portion of the impeller 313 is removed, and hence, when the impeller 313 receives the thrust load, the impeller 313 is biased towards the stator coils 323. In this embodiment, there is no bearing for supporting the radial load. The synthetic resin 354 is positioned positioned between the ceramic large disk plate 332 and the stator coils 323, and hence the thickness of the ceramic large disk plate 332 may be reduced. The numeral 300 denotes an annular supporting member mounted to the pump casing 306 for supporting the annular ceramic large disk plate 332.

In the preferred embodiments of the invention, when the polarities of the permanent magnet mounted to the impeller are four, the number of the polarities of the stator coils is preferably five or six. When the number of the polarities of the permanent magnet of the impeller is six, as shown in FIG. 6, the number of the polarities of the stator coils is preferably six to eight.

In the preferred embodiments of the invention, the ceramic material for making the bearing plates and other members is $\alpha$-SiC, $\beta$-SiC, $Al_2O_3$, $Si_3N_4$ or the like.

It is readily understood from the above description that in the pump according to the present invention, the spiral groove pattern is formed by the shot-blasting process on one of the opposed surfaces of the ceramic end plate of the impeller and the ceramic bearing plate of the pump casing for producing the dynamic pressure, and the ceramic end plate and the ceramic bearing plate constitute a dynamic pressure bearing means. When the impeller is rotated and the impeller is biased towards the dynamic pressure bearing means by the thrust or its weight, a liquid film is formed between the two bearing members by means of the spiral grooves, and accordingly the impeller is not directly contacted with the casing at the dynamic pressure bearing means. Further, the ceramic members used in the bearing means and other portions of the pump have superior properties such as a corrosion reristance to various liquids are wearproof and so forth.

For instance, in the dynamic pressure bearing means comprising a pair of hard ceramic disk plates having a diameter of 86 mm, one disk plate having a spiral groove pattern formed by the shot-blasting process, this bearing means can bear a thrust load of more than one ton at 2000 r.p.m. under water at an ambient temperature, and hence the thrust load less than 50 kgf usually produced in a pump of this kind can be sufficiently supported. In this case, the power loss is quite small.

In the pump of FIG. 6, a foreign substance (solid) cannot easily come in between the impeller and the stator coils, but, even if a foreign substance comes in, the end plate and the protecting plate of the impeller and the bearing plate and the protecting plate of the stator coil side are made of the hard ceramic material, thereby having an extreme durability. Further, even when the ceramic protecting plates are broken away, since they are backed by the synthetic resin, the liquid cannot leak outside and the components cannot be corroded.

In the pump of FIG. 6, when the pump is started to operate, the impeller is supported by the small ball of the pivot bearing means, and thus the starting torque required is quite small. This feature is very advantageous when dealing with a liquid containing a viscous or sticky substance. Further, since the stator coils are contacted with the liquid via the thin ceramic protecting plate, the heat generated in the stator coils and the cores can be quickly released to the liquid with a high heat radiation effect.

Further, in the pumps of the present invention, since the amount of liquid staying space in the pump casing is very small, the cleaning of the inside of the pump may be readily conducted. Further, a readily deteriorative liquid may be conveniently dealt with, and such a liquid will not stay for a long time in the pump to prevent the deterioration.

Further, since the magnetic fields of the stator coils pass from the cores to the permanent magnet of the impeller through the thin ceramic protecting plates, a large rotating torque can be obtained.

In the pump of FIG. 6, on starting and stopping of the pump, solid contact is carried out in the pivot bearing means only when the pumping pressure is low, but, since the relative rotating speed is small in the pivot bearing means, substantially no wear will be caused. At the regular operation speed, the impeller is supported by the dynamic pressure bearing means, and hence, even when the powder is produced were in the pump, the liquid to be pumped will not be contaminated.

In the upright pump of the invention, since the impeller is rotated around a vertical axis and the weight of the impeller functions as the thrust load, the radial load can be greatly reduced. In this case, the dynamic pressure bearing means for supporting the thrust load has a large surplus of bearing capacity, and this load arrangement is preferable.

Although the permanent magnet is provided in the impeller in the preferred embodiments of the invention, an annular secondary conductor may be arranged in the impeller, and the six to eight polarities of the stator coils can be disposed to make the secondary conductor generate the induced current by the rotaty magnetic fields of the stator coils, thereby generating the rotary torque in the impeller. In this case, there is no drawing force of the permanent magnet, and the starting torque for the impeller is very small. Further, the dynamic pressure bearing means may be designed by considering only the back pressure of the pump.

Although the present invention has been described in its preferred embodiments with reference to the accompanying drawings, it is readily understood that various changes and modifications may made by a person

What is claimed is:

1. A pump comprising:
   a casing having an inlet and an outlet;
   a shaftless impeller having a rotary axis and rotatably mounted within the casing for rotation about said rotary axis;
   driving force receiving means disposed to the impeller,
   said driving force receiving means being an annular permanent magnet in an outer rear end of the impeller perpendicular to said rotary axis and having alternating magnetic polarities in the peripheral direction thereof;
   stator coils arranged within the casing opposed to said outer rear end of said impeller and which impart the driving force to the driving force receiving means;
   separating means mounted on the casing for separating the impeller from the stator coils;
   a first element secured to one end of the impeller in a plane perpendicular to the rotary axis of the impeller; and
   a second stationary element arranged in the casing opposing the first element arranged in the casing opposing the first element and in parallel therewith,
   the first and the second elements being adapted to abut against each other at their flat surfaces, one of the opposed flat surfaces of the first and the second elements having a spiral groove pattern forming a dynamic bearing therebetween, the first and the second elements being made of a ceramic material, said impeller being supported by a dynamic pressure produced between said first and second elements during rotation of said impeller for making said impeller shaftless.

2. A pump as claimed in claim 1, wherein the ceramic material is a sintered body selected from the group consisting of $\alpha$-SiC, $\beta$-SiC, $Al_2O_3$ and $Si_3N_4$.

3. A pump as claimed in claim 1, wherein the first element is secured to the central portion of the rear end of the impeller, the rear end of the impeller facing to the separating means, and the first element is provided with the spiral groove pattern on its flat surface.

4. A pump as claimed in claim 1, wherein the first element is secured to the central portion of the front end of the impeller, the rear end of the impeller facing to the separating means, and the second element is provided with the spiral groove pattern on its flat surface.

5. A pump as claimed in claim 4, wherein the impeller is provided with a central through-hole along its rotary axis, and the first element is an annular plate which is secured to the impeller coaxially with the central through-hole.

6. A pump as claimed in claim 4, wherein the first element is a circular plate which is secured to the impeller coaxially with its rotary axis.

7. A pump as claim 6, wherein said annular permanent magnet surrounds the first element.

8. A pump as claimed in claim 7, wherein the separating means comprises a first ceramic plate secured to the impeller covering a surface of the driving force receiving means and a second ceramic plate secured to said casing opposing said first ceramic plate in parallel therewith.

9. A pump as claimed in claim 4, wherein the first element is an annular plate, and the second element is an annular plate of the same form as that of the second element, the second element being mounted to the inlet portion of the casing.

10. A pump as claimed in claim 9, wherein the pump further comprises a third element secured to the central portion of the rear end of the impeller in a plane perpendicular to the rotary axis of the impeller, and a fourth statationary element arranged in the casing opposing to the third element in parallel therewith, the third and the fourth elements being made of a ceramic material.

11. A pump as claimed in claim 5, wherein the driving force receiving means is an annular permanent magnet which is arranged in the outer rear end of the impeller and surrounds the first element.

12. A pump as claimed in claim 6, wherein the driving force receiving means is an annular secondary conductor which is arranged in the outer rear end of the impeller and surrounds the first element.

13. A pump as claimed in claim 10, wherein the driving force receiving means is an annular permanent magnet which is arranged in the outer rear end of the impeller and surrounds the third element.

14. A pump as claimed in claim 10, wherein the third and the fourth element are each provided with grooves on their opposed surfaces along the rotary axis of the impeller, and a small ball is arranged in a space composed of the grooves.

15. A pump as claimed in claim 11, wherein the annular permanent magnet is covered by an annular ceramic thin plate over its outer surface and is attached by an annular iron plate over its back surface.

16. A pump as claimed in claim 13, wherein the annular permanent magnet is covered by an annular ceramic thin plate over its outer surface and is attached by an annular iron plate over its back surface.

17. A pump as claimed in claim 12, wherein the annular secondary conductor is covered by an annular ceramic thin plate over its outer surface.

18. A pump as claimed in claim 14, wherein the diameter of the small ball is larger than that of the space so that the opposed surfaces of the third and the fourth elements may be away from each other.

19. A pump as claimed in claim 14, wherein the diameter of the small ball is smaller than that of the space, the third and the fourth elements being adapted to abut against each other at their flat surfaces, one of the opposed flat surfaces of the third and the fourth elements having a spiral groove pattern.

20. A pump as claimed in claim 15, wherein the second element is a ceramic thin plate which covers the stator coils on one end opposite to the impeller through a synthetic resin and is mounted to the casing so as to seal the stator coils from the liquid and to separate the stator coils from the impeller.

21. A pump as claimed in claim 16, wherein the stator coils are covered on one end opposite to the impeller by a ceramic thin plate, and the fourth element is mounted to the casing via a synthetic resin, the ceramic thin plate, the synthetic resin and the fourth element sealing the stator coils from the liquid and separating the stator coils from the impeller.

22. A pump as claimed in claim 17, wherein the stator coils are covered on one end opposite to the impeller by a ceramic thin plate, and the second element is mounted to the casing via a synthetic resin, the ceramic thin plate, the synthetic resin and the second element sealing the stator coils from the liquid and separating the stator coils from the impeller.

23. A pump as claimed in claim 1, wherein the separating means comprises a first ceramic plate secured to the impeller covering a surface of the driving force receiving means and a second ceramic plate secured to said casing opposing said first ceramic plate in parallel therewith.

* * * * *